United States Patent Office 2,809,000
Patented Oct. 8, 1957

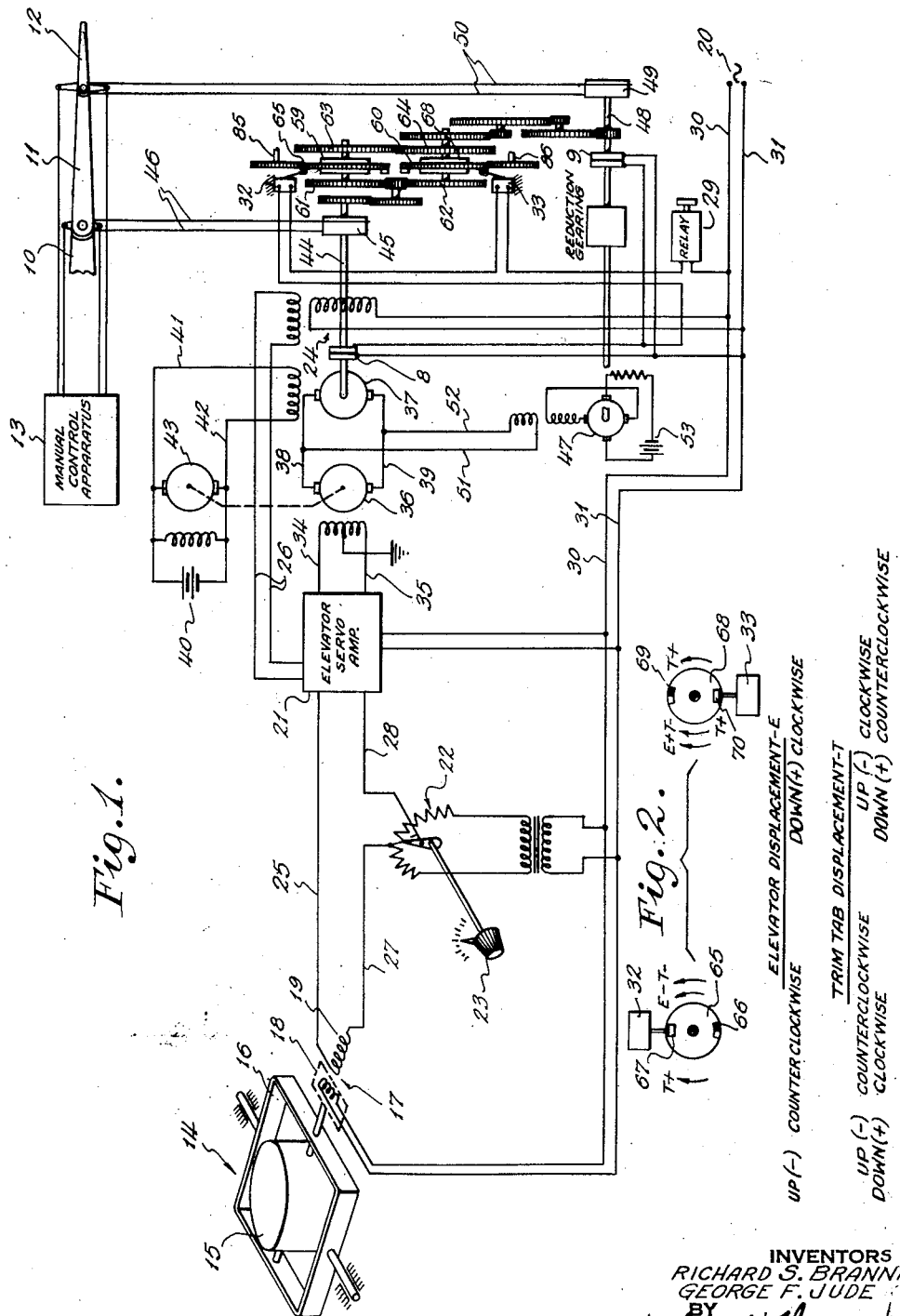

2,809,000

SAFETY SYSTEM FOR NAVIGABLE CRAFT

Richard S. Brannin, East Williston, and George F. Jude, Richmond Hill, N. Y., assignors to Sperry Rand Corporation, a corporation of Delaware Application December 29, 1951, Serial No. 264,175

16 Claims. (Cl. 244—77)

This invention relates to a monitoring system for dirigible craft of the character employing complementary surfaces for controlling its movements about an axis. More particularly, the invention pertains to a sensing means responsive to the respective complementary control surfaces of the craft for combining the effect of the speed and center of gravity conditions of the craft. In automatically piloted types of dirigible craft, the combining means provided in accordance with the present inventive concepts may be utilized to monitor the automatic pilot to adjust or disable its operation and thus protect the craft from damage due to deflection of control surfaces beyond their safe limits. As illustratively depicted in the accompanying drawings, the steering means or automatic pilot of the craft is rendered ineffective by an on-off limit switch electrical arrangement included as a part of the monitoring system, such arrangement operating to cut off the primary supply of electrical energy to the automatic pilot before the control surface of the craft reaches a dangerous deflection.

The monitoring control means of the present invention is also useful in craft that are manually piloted where a safety indicator is employed in combination therewith. Such an indicator may also be used in automatically piloted types of aircraft employed in the improved system.

In other words, the amount to which the control surfaces of an aircraft may be actuated from a trim position without subjecting the craft to excessive structural stresses capable of resulting in damage to the craft is a combined function of airspeed of the craft and the position of the center of gravity of the craft with respect to the axis about which the control surfaces effect movements of the craft. In accordance with the present invention, we determine the limits to which the main control surface may be actuated without resultant strain or damage to the craft under the existing conditions of air speed and position of the craft's center of gravity and provide means imposing such limits upon an autopilot or the control surface-operating mechanisms of the craft such that these limits, which are variable with varying conditions of air speed and position of center of gravity, cannot be exceeded. Alternatively or additionally, an indicating means may be provided to provide an indication to the pilot of such limit values and when they are approached or exceeded.

In accordance with our invention, the safe range of deflection with respect to trim position of the complementary control surfaces of an aircraft is determined by the angular displacements of the associated trim tab or stabilizer element and the main control surface. These displacements represent a combined function of both air speed and the position of the center of gravity condition of the craft relative to the axis of the craft about which movement of the craft is controlled by the control surface and its associated stabilizer or trim tab. Means are therefore provided which operate in accordance with displacements of a trim tab or stabilizer from its trim or reference position to impose limitations on the extent to which an associated control surface may be actuated, such limitations therefore varying both with air speed and the position of the craft's center of gravity condition. As above indicated, a similarly operated or controlled indicator may also be provided.

It is therefore the principal object of this invention to provide a system for preventing the control surfaces of a craft from being actuated to such an extent that damage to the craft structure may result.

More particularly, it is an object to provide means for determining variable limits of operation of the craft control surfaces in accordance with the combined effect of the speed and center of gravity conditions of the craft, and it is an object to impose such limits on the control mechanisms which operate the control surface.

One of the particular features of the invention resides in the provision in the monitoring system of a sensing means operable in accordance with the combined effect of the speed and center of gravity condition of the craft.

Other objects, features and structural details of the invention will be apparent from the following description when read in connection with the accompanying drawings, wherein, Fig. 1 is a schematic view and wiring diagram of a craft monitoring system embodying the present inventive concepts.

Fig. 2 illustrates detail views of the cam and follower parts shown in the form of the invention depicted in Fig. 1 together with the switch parts.

Figure 3:
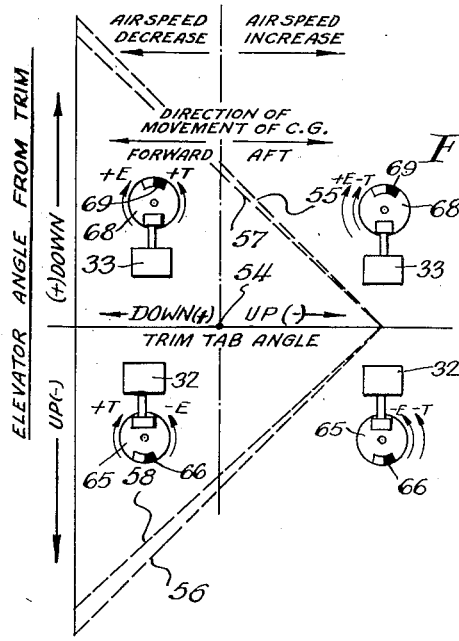
Fig. 3 is a graph hereinafter referred to in the specification in explanation of the fundamentals of the improved system.

It will be understood that the present invention is applicable to the control of, that is, the imposition of limits on, the actuation of any control surface of a craft where an associated trim tab or stabilizer or like surface may be employed. For example, it may be used with aircraft elevators, rudder, ailevators and the like. Furthermore, the present invention may serve to impose limitations on the operating mechanism of the control surface or on an autopilot and an indicator of the above character may also be employed. However, for descriptive purposes, we have described our invention in connection with an autopilot and in connection with the elevator control surface and its associated trim tab of an aircraft.

By the term "primary control surface" we mean to designate one such as an elevator and the like, while by "secondary control surface" we mean an associated surface such as a trim tab and the like.

In the embodiment of the invention shown in Fig. 1, the improved monitoring arrangement is illustrated for use in a manually or an automatically piloted type of dirigible craft, a portion of which is indicated at 10. The type of craft in which the system is employed includes a steering means formed of complementary primary and secondary movable surfaces such as the elevator and trim tab indicated at 11 and 12, respectively. Surfaces 11 and 12 cooperate to control the movements of the craft about its pitch axis. The means for operating the control surfaces 11 and 12 may be an automatic pilot or, a conventional, manually operated, lever-cable arrangement, or both. As shown in Fig. 1, the manually effective control means is designated schematically by a box 13 entitled manual control. Suitable cables interconnect the manual control 13 and the surfaces 11 and 12 of the craft.

An illustrative automatic pilot in which the improved monitoring system is incorporated in Fig. 1, may include a gyro vertical designated at 14 or other standard of position for the craft relative to its pitch axis, in this instance. In such a standard of position, as shown, the rotor case 15 is universally mounted by a conventional gimbal ring 16. The trunnion mounting for the ring 16 in a housing (not shown) situates the major axis of the universally mounted case 15 parallel to or coincident with the fore and aft axis of the craft. The minor axis of the case 15 is perpendicular to the major axis and is situated athwartships of the craft. The minor axis is also parallel to or coincident with the pitch axis of the craft. The pitch reference provided by the gyro vertical 14 is determined by the location of case 15 about its minor axis. An electrical signal transmitter or suitable pick-off about the minor axis provides a signal that measures departure of the craft from the determined pitch standard of position. Such a transmitter as designated at 17 may include a wound rotor part 18 fixed to an extension of a trunnion part of case 15 and a wound stator part 19 suitably fixed to the ring 16. Part 18 of the pick-off 17 is shown as energized from a suitable source 20 of alternating current by way of circuits hereinafter particularly described.

Pick-off or transmitter 17 produces an automatic pilot operating signal whose amplitude depends on the extent of the relative angular displacement of the craft about its pitch axis from the reference position and whose phase depends on the sense of the displacement from the reference position. When the craft is in the defined pitch reference position, the pick-off 17 provides a null output. With the automatic pilot functioning correctly, the pick-off 17 provides a signal that moves the elevators negatively or upwardly to correct the craft for a transient nose down condition. Similarly the pick-off 17 functions to provide a signal that moves the elevators positively or downwardly to correct the craft for a transient nose up condition.

In the automatic pilot shown in Fig. 1, the output of pick-off 17 is fed to an elevator servo amplifier indicated at 21. The input circuitry to amplifier 21 may further include a potentiometer 22 whose slider element is set by a manually movable knob 23. Knob 23 is adjusted by the pilot to effect climbs or dives of the craft through operation of the automatic pilot. A further input to the amplifier 21 may be obtained from an elevator displacement measuring electrical pick-off or transmitter 24. As shown, the wound rotor of transmitter 24 is positioned in accordance with the position of elevator 11, the same being located on the output shaft of the servomotor of the automatic pilot to this surface. Lead 25 connects one side of the stator of pick-off 17 to amplifier 21 and lead 27 connects the other side of pick-off 27 with the center tap potentiometer 22. Leads 26 connect the stator of pick-off 24 to the amplifier 21. The slider of the potentiometer 22 is connected by lead 28 to one terminal of the servo amplifier 21.

A self-locking relay 29 with release and set push buttons is connected in series with the limit switches, hereinafter described, to control the energization of clutches on the output shafts of the elevator and trim tab servomotors. Thus, when the pilot wishes to engage the autopilot, he closes relay 29 which automatically locks in and when a limit condition is reached causing one or the other of the limit switches to open, this relay opens, thereby disabling the autopilot. In this way the pilot can know that a limit condition has been reached. Leads 30 and 31 connect source 20 with pick-offs 17 and 24, the amplifier 21, and potentiometer 22. On-off limit switches, which are normally closed, are designated respectively at 32 and 33 and are included in series relation in the disabling circuit of the automatic pilot.

The output of amplifier 21, as shown, is adapted to feed a motor-generator set of the Ward-Leonard type by way of leads 34, 35 which connect with the field circuit of a direct current generator 36. In the arrangement illustrated, the armature circuit of the generator 36 energizes the armature of a servomotor 37 by way of leads 38 and 39. The field of servomotor 37 is energized from a constant direct current source such as battery 40 by way of leads 41 and 42. Generator 36 is driven by a constant speed motor 43 that is energized from source 40. The servomotor 37 is operatively connected to the elevator or control surface 11 by way of shaft 44, drum 45 and cable 46. Servomotor 37 turns shaft 44 in accordance with the alternating current input signal to amplifier 21. The repeat back signal from pick-off 24 is fed to the amplifier 21 in opposition to the signal input thereto from either pick-off 17 or potentiometer 22.

The trim tab surface 12 of the craft is positioned, as shown, by a servomotor 47 by way of shaft 48, drum 49 and cable 50. The field winding of servomotor 47 is connected in parallel across the leads 38, 39 of the armature circuit of servomotor 37 by way of leads 51 and 52. The armature of servomotor 47 is constantly excited by means such as a battery 53. A second field winding provides a means for damping and limiting the speed of operation of servomotor 47 as shown and claimed in U. S. Patent No. 2,474,830, issued July 5, 1949. A series resistor is provided to maintain a substantially constant armature current for servomotor 47. In accordance with the automatic pilot system described and claimed in U. S. Patent No. 2,568,719, issued September 25, 1951, the herein described pilot functions so that the servomotor 37 for the elevator 11 and the servomotor 47 for the trim tab 12 are both operated from the same corrective signal. However, the servomotor 37, due to its system design, operates to correct short-time transient errors such as caused by shifting gusts of wind on the craft where the craft is an aircraft, such errors being of a relatively high magnitude. The servomotor 47 operates to correct such craft for any sustained or long period errors, such as caused by a permanent shift in loading of the craft, such errors usually being of a relatively slowly changing character. The system of servomotor 47 has a much slower response characteristic than that of motor 37.

Electromagnetic clutches such as indicated at 8 and 9 connect the respective servomotor 37 with surface 11 and servomotor 47 with surface 12 when the relay 29 is closed, the clutches being connected under the control of switches 32, 33 and relay 29 across the leads 30, 31, as shown. With relay 29 in the open position the surfaces 11 and 12 are disconnected from servomotors 37 and 47 by the respective clutches, the automatic pilot being thereby disabled.

In accordance with the present invention, the improved monitoring system is adapted to limit the range of operation of the servomotor 37 or position of surface 11 to prevent overloading the craft's structure. The limitations of permitted surface travel are adjusted to compensate for changes in the craft's center of gravity condition as well as for changes in air speed. The invention provides means responsive to the angular position of trim tab 12 to provide a control in accordance with the combined effect of the speed and center of gravity condition of the craft. This is accomplished by adjusting the permitted range of elevator displacement, for example, from a trim position in accordance with the long term elevator trim position in straight, unaccelerated flight. This position provides a definite index of the craft's center of gravity condition at any air speed in addition to being an index of air speed at any center of gravity condition.

The improved system is superior to a monitoring system where the elevator travel limits are adjusted to compensate for changes in air speed only. In such a system, the adjustment of the elevator deflection or displacement limits would necessarily be made with reference to the most aft center of gravity condition expected in flight, since elevator displacements from trim that would not produce excessive normal load factors at a forward center of gravity condition would do so at a rearward center of gravity condition at the same air speed. However, with elevator travel limitations adjusted to prevent excessive normal load factors at the most aft center of gravity condition, the load factors which are attainable at forward center of gravity conditions would be reduced thereby lessening to a considerable degree the permissible range of the craft's maneuverability. Adjusting the elevator limits to compensate for changes in center of gravity condition as well as for changes in air speed avoids this loss in maneuverability at forward center of gravity conditions.

With reference to Fig. 3 in explanation of the herein disclosed inventive concepts, the ordinate dimension of the depicted graph represents positive and negative, respectively down-up, elevator angle displacement from a trim position. If plotted from a trim position, that is, one in which no load is on the control column to maintain straight and level flight, then the converging lines 55, 56, of the graph would be asymmetrically positioned with respect to the abscissa. The abscissa dimension of the illustrated graph depicts negative and positive, respectively airplane nose up-down, trim tab angle displacement from a point 54. Lines 55, 56 represent the maximum permitted servo travel limits for the elevator surface 11 of a particular craft. Lines 57, 58 indicate the particular range of elevator travel limits allowed for the considered craft which includes a factor of safety before the cut-off or disabling means is rendered effective. Point 54, in Fig. 3 moves to the right when the center of gravity condition (C. G.) moves further aft in the craft and when the air speed (V) of the craft increases. Point 54 moves to the left as viewed in Fig. 3 when the center of gravity condition (C. G.) moves forward and when the air speed (V) of the craft decreases. From the graph in Fig. 3, it is noted that the range of permitted travel of the elevators of the craft diminishes as point 54 moves to the right and the range increases as the point 54 moves to the left. The safe range of permitted elevator deflections from trim for different speeds and center of gravity conditions of a considered craft is located within the limits defined by the lines 57, 58. For a particular speed and center of gravity craft condition such as depicted at point 54, the range is determined by the positive and negative ordinate dimension from point 54 to the respective lines 57, 58.

In accordance with the invention, means are provided for obtaining a measurement of both the positive and negative displacement of the primary control surface or elevator 11 and the positive and negative displacement of the secondary control surface or trim tab 12. In the form of the invention shown in Fig. 1, such means for surface 11 is provided by shaft 44 through its connections to the surface including the drum 45 and cable 46. The corresponding means for surface 12 is provided by shaft 48 which is connected to the surface 12 by way of drum 49 and cable 50. In the described form of the invention, the means for combining the noted measurements is provided by a pair of mechanical differentials indicated at 59 and 60, respectively. Differential 59 may consist of two oppositely disposed bevel gears, driven respectively by the input gears 61 and 63, and a planetary gear interconnecting the bevel gears that is itself rotatable about an axis perpendicular to the axis of the cam element 65. The planetary gear formed as a part of the cam element 65 determines the output of the differential 59 by rotation of the element about its axis. Differential 60 may be similarly constructed. The input to the respective differentials from shaft 44 is provided by a suitable gearing arrangement, as shown, through which the input gear 61 for differential 59 and input gear 62 for differential 60 move together in the same sense of rotation with a given movement of the surface 11. The input to the respective differentials from shaft 48 is provided by a suitable gearing arrangement, as shown, through which the input gear 63 for differential 59 and input gear 64 for differential 60 move together in the opposite sense of rotation with a given movement of the surface 12. The output part of differential 59 shown in Fig. 1 is represented by a cam element 65 with a boss 66 adapted to move a cam follower 67 on the operating arm of the described on-off switch 32 to open the normally closed switch 32 and thereby disable the automatiic pilot to thus render the same ineffective. The corresponding part of differential 60 is represented by cam element 68 with a boss 69 adapted to move a cam follower 70 on the operating arm of the switch 33, the same also functioning in the arrangement shown to disable the automatic pilot.

The relative motions of the differential outputs as reflected by the cam elements 65 and 68 in the monitoring system are noted in detail in Figs. 2 and 3 of the drawing. In this form of the invention, the differential 59 controlling cam 65 combines negative displacement of the primary surface measuring means with negative displacement of the secondary measuring means additively and negative displacement of the primary measuring means with positive displacement of the secondary measuring means subtractively. Differential 60 controlling cam 68 is also shown to combine the positive displacement of the primary measuring means with the positive displacement of the secondary measuring means subtractively and the positive displacement of the primary measuring means with the negative displacement of the secondary measuring means additively. Positive tab results in negative elevator and negative tab results in positive elevator. Thus for any given speed or gravity condition of the craft, the cam and follower device operating switch 32 is effective to govern the up elevator travel limits by the line 58. Switch 33 is similarly effective to limit the down elevator travel by the line 57. Fig. 3 illustrates the manner in which the surface motions E and T combine to provide the limit lines 57 and 58.

Point 54 in Fig. 3 changes position dependent on the air speed of the craft and the loading or center of gravity condition of the craft. For an aft condition of loading and a high air speed, the trim condition of the elevators to maintain the craft in straight flight requires negative (airplane nose down) trim tab to obtain sufficient positive elevator to maintain the craft in level flight. As depicted in Fig. 3, the range of permitted movement of the elevators under such conditions is reduced. For forward center of gravity conditions of loading and at lower air speed, the range of permitted movement of the elevator is increased. Fig. 3 also shows that with positive elevator and negative tab, progressively smaller elevator deflections are required to trip switch 33 as the trim tab moves up from point 54. Also, with positive elevator and positive tab, progressively greater elevator deflections are required to trip switch 33 as the trim tab moves down from point 54. With negative elevator and positive tab, progressively greater elevator deflections are required to trip switch 32 as the trim tab moves down from point 54. Further, with negative elevator and negative tab, progressively smaller elevator deflections are required to trip switch 32 as the trim tab moves up from point 54.

The trim angle of the elevator 11 is proportional to the angle of the trim tab 12 in a reversed sense. As the trim angle of elevator 11, Fig. 1, changes from minus to plus (up elevator to down elevator), the upper limit as determined by the spacing or distance of cam actuator 66 from switch 32 for down elevator is lowered and the lower limit as determined by the spacing or distance of cam actuator 69 from switch 33 for up elevator is raised. The reverse action occurs as the trim angle of the elevator 11 changes from plus to minus (down elevator to up elevator). The response of the differentials 59 and 60 to elevator trim angle changes as effected through shaft 48 and the connecting gearing therebetween is progressive and at the same equal linear rate. The gear ratios between the measured inputs from the surfaces 11 and 12 are selected as desired to obtain the proper regulation for individual craft.

Figure 4:
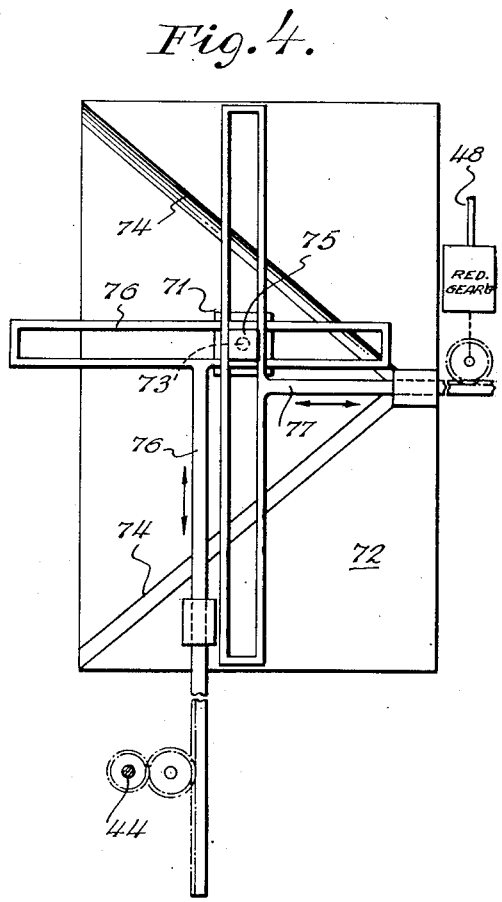
Fig. 4 is a schematic view showing a modified form of the invention.

In the form of the invention shown in Fig. 4, the disabling means illustrated may include a single, normally closed, on-off electrical switch 71 in place of the switches 32 and 33 shown in Fig. 1. In this arrangement, the extending actuating element for the switch is adapted to contact the bevelled edge 74 of a fixed cam surface in a stationary cam block 72. The cam surface provided has the configuration of lines 57, 58 in Fig. 3 which define the travel range or limits permitted the elevators. The switch actuating element designated at 73 is effective to open the switch 71 only upon contact of the same with the bevelled surface of the fixed cam as designated at 74. Instead of the differential mechanisms provided in Fig. 1, the single combining device utilized in this described structure includes adjustable means determining the maximum limits of elevator travel or an automatic pilot in accordance with changes in speed and center of gravity condition having an elevator deflection input to translate slider 76 and a trim tab deflection input to translate slider 77. The output of the adjusting means is provided by boss 75 that extends from the body of switch 71 to position the actuating element 73 of switch 71 relative to the cam surfaces 74 of block 72. The position of the boss 75 is determined by the variable input factors for the combining means, one of which is obtained from the vertically movable slider 76 driven by way of a suitable gear and rack connection from elevator servo shaft 44. The other of the inputs is obtained from the horizontally movable slider 77 which is driven from trim tab shaft 48 by way of a suitable gear and rack connection and a gear reduction interconnection. Slider 76 has a horizontal slot engaging the boss 75 and slider 77 has a vertical slot also engaging the boss 75. The two sliders 76 and 77 combine the displacements of the surfaces 11 and 12 to determine the position of the actuating element 73 with respect to the limiting cam surface 74. In the relation of the parts depicted in Fig. 4, the elevator travel limits are determined by the cam surface 74. Movements of the elevator within these limits as reflected in motion of the boss 75 vertically in the slot of slider 77 is permitted without disabling the automatic pilot. With change in the positions of the sliders 76 and 77, the permitted range of operation for the elevators is varied or adjusted automatically in accordance with the speed and center of gravity condition of the craft.

Figure 5:
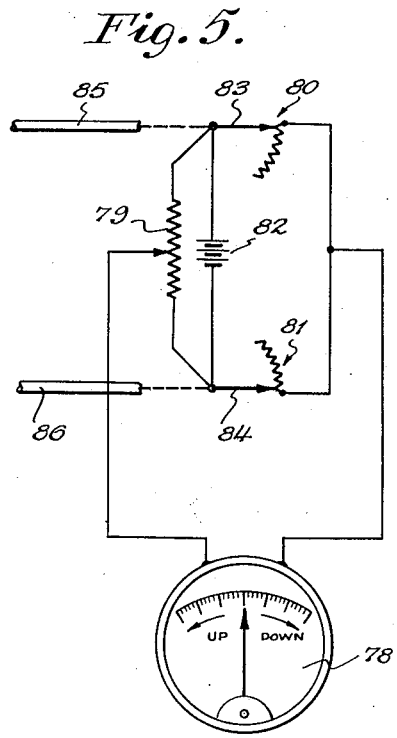
Fig. 5 is a further schematic view and wiring diagram showing an extension of the system as applied to Fig. 1 in which the system includes an indicating element.

Fig. 5 shows an adaption of the invention with an indicator that is useful with or without the automatic pilot. The indicator designated at 78 may be a conventional direct current electrical galvanometer that is operated from a bridge circuit including impedance 79 and two potentiometers 80, 81. The bridge is energized by means of a battery 82. The slider 83 of potentiometer 80 is positioned by shaft 85 driven from the output of differential 59, Fig. 1, by suitable gearing. The slider 84 of potentiometer 81 is positioned by shaft 86 driven from the output of differential 60. The dial of the indicator 78 may be calibrated in percentage of allowable elevator deflection. Thus, the pilot by observation of the indicator is able to ascertain the permissible extent to which the elevator may be actuated when the craft is manually controlled by the manual control apparatus 13. The pointer provides an equivalent reading relative to the dial that would be obtained by the pilot if he were able to observe the position of the boss 75 relative to the cam surface 74 in Fig. 4.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a dirigible craft having complementing primary and secondary movable surfaces for controlling its movement about an axis, means for displacing said surfaces, means for measuring the positive and negative displacement of the primary surface, means for measuring the positive and negative displacement of the secondary surface, means for combining the positive displacement of the primary measuring means with the negative displacement of the secondary measuring means additively and the positive displacement of the primary measuring means with the positive displacement of the secondary measuring means subtractively, means for combining the negative displacement of the primary measuring means with the positive displacement of the secondary measuring means subtractively and the negative displacement of the primary measuring means with the negative displacement of the secondary measuring means additively, and means combining the effect of the speed and center of gravity condition of the craft operated by said first and second combining means.

2. In a manually piloted aircraft having complementary primary and secondary surfaces for controlling its movements about an axis, means for displacing said surfaces, means for measuring the positive and negative displacement of the primary surface, means for measuring the positive and negative displacement of the secondary surface, a differential additively combining positive displacement of the primary surface measuring means and negative displacement of the secondary surface measuring means having an output, a second differential additively combining negative displacement of the primary surface measuring means and negative displacement of the secondary surface measuring means having an output, and an indicator operated in accordance with the outputs of said differentials.

3. In a manually piloted aircraft having complementary elevator and trim tab surfaces, means for displacing said elevator and trim tab surfaces, means for measuring the positive and negative displacement of the elevator, means for measuring the positive and negative displacement of the trim tab, a differential additively combining positive displacement of the elevator measuring means and negative displacement of the tab measuring means having an output, a second differential additively combining negative displacement of the elevator measuring means and negative displacement of the tab measuring means having an output, and an indicator operated in accordance with the outputs of said differentials.

4. In a dirigible craft having complementary primary and secondary movable surfaces for controlling its movements about an axis, automatic pilot means for displacing said surfaces, means for measuring the positive and negative displacement of the primary surface, means for measuring the positive and negative displacement of the secondary surface, a differential additively combining positive displacement of the primary surface measuring means with negative displacement of the secondary surface measuring means having an output, a second differential additively combining negative displacement of the primary surface measuring means with negative displacement of the secondary surface measuring means having an output, and means operated by the outputs of said differentials for monitoring said automatic pilot means.

5. The combination claimed in claim 4, in which said monitoring means includes an on-off switch for each of said differentials operable to disable said automatic pilot means.

6. In an aircraft having an elevator and a trim tab, automatic pilot means for displacing said elevator and trim tab, means for measuring the positive and negative displacement of the elevator, means for measuring the positive and negative displacement of the trim tab, a differential additively combining positive displacement of the elevator measuring means and negative displacement of the tab measuring means having an output, a second differential additively combining negative displacement of the elevator measuring means and negative displacement of the tab measuring means having an output, and means for monitoring said automatic pilot means in accordance with the combined effect of the air speed and center of gravity condition of the craft responsive to the outputs of said differentials.

7. In an aircraft having an elevator and a trim tab, automatic pilot means for displacing said elevator and trim tab, means for measuring negative displacement of the elevator, means for measuring positive and negative displacement of the trim tab, differential means, additively combining negative displacement of the elevator measuring means with negative displacement of the trim tab measuring means and subtractively combining negative displacement of the elevator measuring means with positive displacement of the trim tab measuring means, having an output, and means for monitoring said automatic pilot means in accordance with the output of said differential means.

8. In an aircraft having an elevator and a trim tab, automatic pilot means for displacing said elevator and trim tab, means for measuring positive displacement of the elevator, means for measuring positive and negative displacement of the trim tab, differential means, additively combining positive displacement of the elevator measuring means with negative displacement of the trim tab measuring means and subtractively combining positive displacement of the elevator measuring means with positive displacement of the trim tab measuring means, having an output, and means for monitoring said automatic pilot means in accordance with the output of said differential means.

9. In an aircraft having an elevator and a trim tab, means for displacing said elevator and trim tab from a null condition, differential means, operable in accordance with positive displacement of the elevator and positive and negative displacement of the trim tab, having an output, second differential means, operable in accordance with negative displacement of the elevator and positive and negative displacement of the trim tab, having an output, and an indicator operated in accordance with the outputs of said differential means.

10. In a dirigible craft having complementary control surfaces, means operable in accordance with the combined effect of the speed and center of gravity condition of the craft including a differential having an output and two inputs, means operatively connecting one of the inputs of the differential to one of the control surfaces, and means operatively connecting the other of the inputs of the differential to the other of the control surfaces so that the respective differential inputs are additive with movement of one of the surfaces in a positive sense and movement of the other of the surfaces in a negative sense, and are subtractive with movement of the one surface in a positive sense and movement of the other surface in a positive sense.

11. In an aircraft having an elevator and trim tab, means operable in accordance with the combined effect of the speed and center of gravity condition of the craft including a differential having an output and two inputs, means operatively connecting one of the inputs of the differential to said elevator, and means operatively connecting the other of the inputs of the differential to said trim tab so that the respective differential inputs are additive with negative movement of the elevator and with negative movement of the trim tab.

12. Means for monitoring the automatic operation of a dirigible craft having complementing primary and secondary control surfaces including motive means for displacing said control surfaces, a pair of normally closed switches for limiting the operation of said motive means, a first differential additively measuring positive displacement of one control surface and negative displacement of the other control surface having an output, a cam and follower device responsive to the output of said first differential for opening one of said switches, a second differential additively measuring negative displacement of said one control surface and negative displacement of the other control surface having an output, and a second cam and follower device responsive to the output of said second differential for opening the other of said switches.

13. In a dirigible craft having complementary primary and secondary movable surfaces for controlling its movements about an axis, automatic pilot means for displacing said surfaces; and means for monitoring the automatic pilot means including disabling means, adjustable means cooperating with said disabling means determining the permitted outside limits of operation of the automatic pilot in accordance with the combined effect of the speed and center of gravity condition of the craft having two variable inputs, means determining one of said inputs by the displacement of the primary surface, and means determining the other of said inputs by the displacement of the secondary surface.

14. In a dirigible craft having complementary elevator and trim tab surfaces, automatic pilot means for operating said surfaces; and monitoring means for rendering the automatic pilot means ineffective including adjusting means having an output and two inputs whose output cooperates with said monitoring means to limit the permitted range of operation of said automatic pilot means, means operatively connecting one of said inputs with the elevator surface, and means operatively connecting the other of the inputs with the trim tab surface.

15. In a monitoring system for dirigible craft having complementary control surfaces, steering means operatively connected to the control surfaces, sensing means operable in accordance with the combined effect of the speed and center of gravity condition of the craft, means for monitoring said steering means including relatively adjustable limit defining elements, one of which is fixed in relation to the craft and the other of which is movable in relation to the fixed limit element by said steering means, and means operatively connecting said sensing means and said movable limit element whereby the range of its movement is adjusted.

16. In a monitoring system for dirigible craft having complementary control surfaces, automatic pilot means operatively connected to the control surfaces, sensing means operable in accordance with the combined effect of the speed and center of gravity condition of the craft, means for rendering said automatic pilot means ineffective including relatively adjustable limit defining elements, one of which is fixed in relation to the craft and the other of which is movable in relation to the fixed limit element by said automatic pilot means, and means operatively connecting said sensing means and said movable limit element whereby the range of its movement is adjusted.

References Cited in the file of this patent

UNITED STATES PATENTS

| 2,492,745 | Hammes | Dec. 27, 1949 |
| 2,568,719 | Curry | Sept. 25, 1951 |
| 2,620,149 | Strother | Dec. 2, 1952 |
| 2,673,048 | Smith | Mar. 23, 1954 |

FOREIGN PATENTS

| 730,006 | Germany | Jan. 6, 1943 |